United States Patent [19]

Willemse

[11] Patent Number: 4,806,374

[45] Date of Patent: Feb. 21, 1989

[54] FAT PRODUCT WITH IMPROVED PROPERTIES

[75] Inventor: Jules M. Willemse, Rijswijk, Netherlands

[73] Assignee: Lever Brothers Company, New York, N.Y.

[21] Appl. No.: 85,042

[22] Filed: Aug. 12, 1987

[30] Foreign Application Priority Data

Aug. 19, 1986 [NL] Netherlands .......................... 8602110

[51] Int. Cl.$^4$ ............................................. C11B 5/00
[52] U.S. Cl. .................................. 426/330.6; 426/417; 426/488; 426/544; 426/601; 426/610
[58] Field of Search ................... 426/544, 330.6, 610, 426/438, 601, 613, 417, 488

[56] References Cited

U.S. PATENT DOCUMENTS

| | | | |
|---|---|---|---|
| 2,634,213 | 4/1953 | Martin | 426/544 |
| 2,998,319 | 8/1961 | Babayan | 426/610 |
| 3,460,948 | 8/1969 | Linteris et al. | 426/438 |

FOREIGN PATENT DOCUMENTS

191519 8/1986 .
1200450 7/1970 United Kingdom .

Primary Examiner—Donald E. Czaja
Assistant Examiner—Celine Callahan
Attorney, Agent, or Firm—Milton L. Honig; James J. Farrell

[57] ABSTRACT

The invention relates to fat products to be subjected to prolonged heat treatment at temperatures above 120° C., such as shallow-frying, deep-frying, baking, preparing fondue, roasting, etc. The fat products according to the invention comprise an effective amount of a combination of (a) silicones and (b) a component selected from the group consisting of linalool, linalyl acetate and mixtures thereof. Curcuma components may be added to further enhance heat resistance. The present fat products, as compared with known fat products, develop hardly any unpleasant odors when heated for a longer period of time and/or exhibit only a very small decrease in smoke point after such treatment. The fat products according to the present invention therefore have an increased lifetime.

9 Claims, No Drawings

FAT PRODUCT WITH IMPROVED PROPERTIES

FIELD OF THE INVENTION

The invention relates to fat products which suitably can be subjected to prolonged heat treatments such as shallow-frying, deep-frying, baking, preparing fondue, and roasting.

BACKGROUND OF THE INVENTION

In general, fat products subjected to prolonged heating at temperatures above 120° C. deteriorate, in that they develop unpleasant aromas and/or smoke.

Although, generally speaking, both odour and taste are meant by "aroma", in this description the emphasis lies on the odour impression which the fat products according to the present invention cause on use. However, the observations made below with respect to the odour also apply to a greater or lesser extent to the taste of the fat product (after use) and the flavour of foodstuffs which have been deep- or shallow-fried in such a fat product. In the evaluation of odour impressions both the character of the odour and the intensity of the odour play a role.

From Dutch patent application NL-A-No. 6 616 686 (Unilever) it is known to prevent the development of unpleasant odours during shallow- or deep-frying by incorporating 25 to 1000 parts per million of essential oils in fat products. The non-prior published European patent application EP-A-No. 86 200 102.1 (Unilever) reports, moreover, that the development of unpleasant odours can be prevented by incorporating 0.5–50 mg linalool and/or linalyl acetate per kg product in fat products. A problem with the prevention of the development of undesired odours during for instance deep- or shallow-frying, by using products such as described above, is that, after deep-frying or shallow-frying a few times, the effect of the masking components has strongly diminished, whereafter unpleasant odours again become perceptible during deep- and shallow-frying.

U.S. patent specification U.S. Pat. No. 2,634,213 (Procter & Gamble) reports that oxidative degradation and discoloration are prevented by the addition of 0.03–0.5 ppm methyl silicones to fat products.

U.S. Pat. No. 2,998,319 (E. F. Drew) discloses the use of 1–25 ppm silicones in optionally hydrogenated vegetable oils in order to raise the decomposition temperature (smoke point).

SUMMARY OF THE INVENTION

It has now been found that the development of unpleasant odours and/or smoke during the heating of fat products to temperatures of 120° C. and higher can be prevented for a long time by adding to such products an effective amount of linalool and/or linalyl acetate and/or curcuma components as well as silicones. In this application, by an effective amount is meant an amount that is sufficient to prevent noticeably the development of undesired odours and/or smoke. As compared with known fat products, fat products according to the present invention appear to develop hardly any unpleasant odours for a longer period of time. Moreover, the decrease in smoke point, which is normally observed when fat products are subjected to prolonged heat treatment, is substantially reduced for the fat products according to the invention.

The fat products according to the present invention barely give off unpleasant odours even after repeated heating up to temperatures between 120° and 200° C. Moreover, the smoke point of the present fat products will remain almost constant for a relatively long period of time.

DETAILED DESCRIPTION

Owing to the combination of on the one hand linalool and/or linalyl acetate, and on the other hand silicones, the "masking effect" of linalool and/or linalyl acetate is prolonged substantially. Also, the positive effect of silicones on the decrease of the smoke point is substantially increased by the combination with curcuma components.

The fat products according to the invention are suited for repeated use in, for example, frying operations, as substantial amounts of undesirable odours develop only after extensive use of the fat products at high temperatures. Besides, after such extensive use, the smoke point remains substantially constant. The fat products according to the present invention therefore have an increased lifetime.

Examples of fat products which are suitable for baking, shallow-frying, roasting, deep-frying, preparing fondue, etc. are baking fat, shallow-frying fat, deep-frying fat, roasting fat, shortening, margarine, salad oil and the like. These fat products often contain a fat or an oil of the type: soybean oil, maize oil, sunflower oil, safflower oil, olive oil, tallow fat or a plastic fat composed of consistent fats, partially hardened oils and interesterified fats. The terms "oil" and "fat" are used interchangeably in this application, and have precisely the same meaning.

Shallow-frying, deep-frying, preparing fondue, etc. are methods of preparing foodstuffs such as French fries, fish, meat and cheese dishes by immersing them completely or partly in a fat product at temperatures of 120–200, usually between 140° and 190° C. Also during, for example, baking and roasting, using a fat product according to the present invention, said product may be heated to such high temperatures.

As a rule, the fat product according to the invention contains linalool and/or linalyl acetate in an amount lying between 1 and 100 mg per kg fat product. Preferably, the fat product contains between 4 and 40 mg linalool and/or linalyl acetate per kg fat product.

Best results are obtained if, in the fat products according to the invention, linalool and linalyl acetate are present in a weight ratio between 2:1 and 1:10, preferably between 1:1 and 1:5.

The curcuma components used in the fat products according to the invention are preferably derived from *Curcuma xanthorrhya, Curcuma aromatica, Curcuma domestica, Curcuma zedoaria, Curcuma casesia, Curcuma amada* or *Curcuma longa;* more preferably the components are derived from *Curcuma longa.*

The curcuma components may be obtained from the original herb in several ways. According to one aspect of the present invention the curcuma component is an essential oil obtained by steam distillation, according to another aspect the component is a dried product, obtained by drying and grinding the herb.

In a preferred embodiment of the invention the fat product comprises as curcuma component ground, dried rhizome. The curcuma components incorporated in the fat product according to the present invention preferably comprise at least 2 wt.%, more preferably at least 6 wt.% Tumerone (Molecular Formula $C_{15}H_{22}O$) and/or ar-Turmerone (Molecular Formula $C_{15}H_{20}O$). The latter compound is formed by aromatization of Turmerone. Such aromatization is promoted by exposure to air.

The concentration level at which the curcuma components are present in the product preferably lies between 0.01 and 20 mg and more preferably between 0.1 and 10 mg.

According to the present invention, besides linalool, linalyl acetate and/or curcuma component, a relatively small amount of silicones is also incorporated in the fat product. Here, "silicones" mean polydimethyl and/or polydiethyl siloxanes having a mainly linear structure. However, small molar amounts of branched and cyclic structures can also be present therein. In the polysiloxane there are at least about 10 monomer units. The average molecular weight can vary from about 1000 to about 2500. The amount of silicones that is used according to the invention in the fat product is normally between 0.02 and 200 mg, preferably between 0.1 and 100 mg per kg.

The linalool and/or linalyl acetate that is used according to the present application is preferably of natural origin, such as for example an essential oil or a fraction thereof.

Examples of such essential oils are: citrus oil, bergamot oil, thyme oil, parsley oil, peppermint oil, nutmeg oil, cinnamon oil, clove oil, angelica oil, sage oil, majoram oil, rosemary oil, savory oil, mace oil, cardemon oil, cassia oil, almond oil, celery oil, fennel oil, onion oil, garlic oil, leek oil, mustard-seed oil, spearmint oil, coriander oil, tarragon oil and aniseed oil. By "citrus oils" are meant in this application oils which are derived from citrus fruits such as oranges, lemons, grapefruits and mandarins. The use of bergamot oil and citrus oil or fractions thereof is preferred.

The fat product according to the present application may comprise triglyceride oils or fats, but also non-toxic material having physical properties which are comparable with those of triglycerides, which material can be indigestible, such as for example jojoba oil, or fatty acid esters of mono- and disaccharides or a mixture thereof. Also foodstuffs in which the fat phase consists of a mixture of such compounds and triglycerides can be used successfully in fat products according to the present invention. The fat products can be used as such, but also in the form of, for example, an edible water-in-oil emulsion such as margarine and the like.

It has appeared that exceptionally good results are obtained if not exclusively linalool and/or linalyl acetate as well as silicones are used in the fat product, but if therein also curcuma components are incorporated. As a rule that hapens in amounts which are between 0.01 and 20 mg per kg fat product. As a result thereof an even better stabilization of the odour properties is obtained, which is particularly valuable in the daily kitchen practice.

The combination of, on the one hand, linalool and/or linalyl acetate and silicones with, on the other hand, curcuma components in the fat product leads not only to better suppression of unpleasant odours, but also results in a relatively high decomposition temperature of the fat after this has been heated to high temperatures several times.

The incorporation of the various ingredients in the fat product preferably takes place by first diluting them in an oil or something similar to a concentrate or so-called master batch which can subsequently be better dosed and more evenly distributed over the fat phase of the fat product.

The invention also encompasses a process for the preparation of foodstuffs by, for instance, shallow-frying, deep-frying, baking or roasting them using a fat product according to the present invention. Here the temperature of the fat product mostly exceeds 120° C. and preferably the preparation takes place using a fat product according to the present invention that has been heated to a temperature lying between 140° and 200° C.

The invention is illustrated by the following examples.

EXAMPLE I

In a comparative test, deep-frying fat A was compared with deep-frying fat B. Fat product B had the same composition as fat product A, except that fat product B also contained 2 ppm polydimethyl siloxane, 2 ppm curcuma components ex McCormick (Tradename) and 120 ppm of a composition that contained bergamot oil, lemon oil and grapefruit oil, and which composition had a total content of linalool and linalyl acetate of 28 ppm, in the ratio linalyl acetate/linalool=1.38:1. Furthermore, the taste of the French fries baked in these products was evaluated.

For the evaluation, products A and B were subjected to the same treatments and evaluated under identical circumstances. The results of this test are shown below in table form. The hedonic scores could vary from 1 to 10, where a high score indicates that the product did not have an unpleasant odour, whereas a low score indicates that the product had a strong off-flavour. The figures in the table were obtained by dividing the sum of the scores coming from the different housewives by the number of housewives.

|  | Fresh deep-frying fat N = 8 | Used fat N = 10 | Total N = 18 |
|---|---|---|---|
| Before deep-frying |  |  |  |
| Smell product A | 5.6 | 5.9 | 5.8 |
| Smell product B | 7.8 | 7.7 | 7.7 |
| During deep-frying |  |  |  |
| Smell product A | 6.3 | 6.6 | 6.5 |
| Smell product B | 7.1 | 9.7 | 8.5 |
| The French fries |  |  |  |
| Taste (A) | 7.1 | 7.6 | 7.4 |
| Taste (B) | 7.6 | 8.1 | 7.9 |

Here N is the number of housewives who gave a score.

If instead of the above composition, containing essential oils, equivalent amounts of linalool and linalyl acetate are applied, similar positive effects on the development of malodours are obtained.

EXAMPLE II

Deep-frying fats A and B as described in Example I were compared with each other by a test panel consisting of five experts by evaluating the smell of these fats after they had been used for deep-frying 12 times under identical conditions.

The panelists hedonically evaluated the smell of the deep-frying fats with a figure that could vary from 1 to 10, whereafter it appeared that the smell of deep-frying fat A after deep-frying 12 times was averaged with 3.8 and the smell of deep-frying fat B with 7.2.

EXAMPLE III

Three groups of 30 persons were asked to give their impression with respect to frying with one of deep-frying fats A, B and C. Deep-frying fats B and C differed from deep-frying fat A in the following way: Deep-frying fat B contained 2 ppm polydimethyl siloxane; Deep-frying fat C contained 2 ppm polydimethyl siloxane, 1 ppm curcuma components and 132 ppm of a composition containing bergamot oil, citrus oil and grapefruit oil, which had a total content of linalool and linalyl acetate of 29 ppm in the ratio linalyl acetate/linalool=1.49:1.

Of the persons who used product C, 37% observed that this product developed less unpleasant odour during and after deep-frying, whereas this percentage for both product A and B was only 20%.

EXAMPLE IV

Two different deep-frying fats were evaluated with respect to odour intensity and odour character by a test-panel. The evaluation of the fats took place before frying, and after frying operations of 12 and 24 hours, respectively, at 180° C. Both frying fats contained 100 ppm of the composition, containing bergamot oil, lemon oil and grapefruit oil, described in Example I. The frying fats differed from each other in that frying fat B additionally contained 2 ppm polydimethyl siloxane.

The evaluations of both the intensity and the character of the odour took place on a scale of 0–10. A high value for the intensity stands for a high intensity, and a low value for the character stands for a strongly unpleasant odour. By dividing the evaluations by the number of panelists, the following resulting were obtained:

|  | Deep-frying fat | |
|---|---|---|
|  | A | B |
| Intensity of the odour | | |
| Essential oil | yes | yes |
| Polydimethyl siloxane | no | yes |
| fresh | 6.1 | 6.5 |
| after 7 × deep-frying (12 hours) | 6.3 | 4.9 |
| after 12 × deep-frying (24 hours) | 6.1 | 5.6 |
| Evaluation of the odour | | |
| fresh | 4.4 | 5.9 |
| after 7 × deep-frying (12 hours) | 4.5 | 5.0 |
| after 12 × deep-frying (24 hours) | 3.5 | 3.5 |

The evaluation of the quality of the oil, taking into account both the odour intensity and the odour character (by dividing the odour character by the odour intensity) gives the following results:

|  | A | B |
|---|---|---|
| Quality of the fat | | |
| fresh | 0.72 | 0.91 |
| after 7 × deep-frying (12 hours) | 0.71 | 1.02 |
| after 12 × deep-frying (24 hours) | 0.57 | 0.63 |

Here a higher score indicates a better product.

Besides the odour being evaluated, the above deep-frying fats were also analysed before deep-frying and after deep-frying for 24 hours at 180° C. The same analyses were carried out for frying fats C and D, differing from frying fat A in that both fats did not contain essential oils, and in that the fat D contained 2 ppm polydimethyl siloxane. Here the following results were obtained:

|  | Deep-frying fat | | | |
|---|---|---|---|---|
|  | A | B | C | D |
| Fresh | | | | |
| Essential oil | yes | yes | no | no |
| Polydimethyl siloxane | no | yes | no | yes |
| Peroxide value | 0.08 | 0.12 | 0.05 | 0.12 |
| Anisidine value | 2.3 | 2.5 | 2.5 | 2.5 |
| Percentage free fatty acids | 0.03 | 0.02 | 0.03 | 0.02 |
| Decomposition point (°C.) | 205 | 210 | 200 | 210 |
| After 12 × deep-frying (24 hours) | | | | |
| Peroxide value | 6.6 | 1.3 | 7.2 | 1.5 |
| Anisidine value | 49.0 | 22.7 | 58.5 | 23.2 |
| Percentage free fatty acid | 0.24 | 0.14 | 0.35 | 0.14 |
| Decomposition point (°C.) | 175 | 210 | 185 | 190 |

EXAMPLE V

Two deep-frying fats to which polydimethyl siloxane and also the essential oil-containing composition of Example 1 had been added, were evaluated by a panel of experts with respect to odour intensity and odour character. The deep-frying fats differed from each other only in that a curcuma extract had been added to one of them.

The two fats were compared by a panel of experts before frying, after 12 hours of frying and after 24 hours of frying, at 180° C. The deep-frying fat containing curcuma extract was clearly preferred to the other frying fat after 12 and 24 hours of frying, as it had both a substantially lower odour intensity and a substantially higher odour appreciation, especially after 24 hours of frying.

With the analysis of both fats before deep-frying therewith and after deep-frying had been carried out 12 times (24 hours) therewith, the following results were found:

|  | Deep-frying fat | |
|---|---|---|
|  | A | B |
| Fresh | | |
| Peroxide value | 0.2 | 0.2 |
| Anisidine value | 4.1 | 4.0 |
| Percentage free fatty acid | 0.05 | 0.05 |
| Decomposition point (°C.) | 210 | 215 |
| After deep-frying 12 times | | |
| Peroxide value | 1.3 | 1.3 |
| Anisidine value | 26.2 | 27.2 |
| Percentage free fatty acid | 0.15 | 0.14 |
| Decomposition point (°C.) | 190 | 205 |

I claim:

1. Fat product to be subjected to prolonged heating at temperatures above 120° C. which fat product comprises an effective amount to reduce unpleasant odor and smoke of a combination of (a) silicones selected from the group consisting of polydimethyl and polydiethyl siloxanes, and (b) a component selected from the group consisting of linalool, linalyl acetate and mixtures thereof.

2. Fat product according to claim 1, wherein the amount of linalool, linalyl acetate, and mixtures thereof lies between 1 and 100 mg per kg fat product.

3. Fat product according to claim 1 wherein the weight ratio of linalool to linalyl acetate lies between 2:1 and 1:10.

4. Fat product according to claim 1 wherein the component selected from linalool, linalyl acetate and mixtures thereof is derived from a material selected from the group consisting of an essential oil and a fraction thereof.

5. Fat product according to claim 4 wherein the essential oil is selected from the group consisting of citrus oil and bergamot oil.

6. Fat product according to claim 1, wherein the amount of silicones is between 0.02 and 50 mg per kg fat product.

7. Fat product according to claim 1, further comprising a curcuma component in an effective amount to further reduce unpleasant odor and smoke.

8. Fat product according to claim 7 wherein the curcuma component consists of ground, dried rhizome.

9. Fat product according to claim 7, wherein the amount of curcuma component is between 0.01 and 20 mg per kg fat product.

* * * * *